(12) United States Patent
Henke et al.

(10) Patent No.: US 8,742,706 B2
(45) Date of Patent: Jun. 3, 2014

(54) ELECTRONICALLY COMMUTATED ELECTRIC MOTOR HAVING EMERGENCY RUNNING PROPERTIES

(75) Inventors: Torsten Henke, Waiblingen (DE); Oliver Wackerl, Waltham, MA (US); Ulrich Vollmer, Bissingen (DE); Dirk Lamprecht, Stuttgart-Rohr (DE)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 13/262,658

(22) PCT Filed: Feb. 18, 2010

(86) PCT No.: PCT/EP2010/052010
§ 371 (c)(1),
(2), (4) Date: Dec. 19, 2011

(87) PCT Pub. No.: WO2010/112262
PCT Pub. Date: Oct. 7, 2010

(65) Prior Publication Data
US 2012/0086372 A1    Apr. 12, 2012

(30) Foreign Application Priority Data

Apr. 1, 2009 (DE) .......................... 10 2009 002 070
Jan. 27, 2010 (DE) .......................... 10 2010 001 241

(51) Int. Cl.
*H02P 6/16* (2006.01)

(52) U.S. Cl.
USPC .................. 318/400.12; 318/400.01; 318/375; 318/565

(58) Field of Classification Search
USPC ............... 318/400.01, 400.12, 375, 565, 701, 318/703; 361/23, 33, 42
See application file for complete search history.

(56) References Cited

U.S. PATENT DOCUMENTS

| 3,784,888 A | * | 1/1974 | Geiersbach et al. ...... 318/400.01 |
| 5,847,533 A | * | 12/1998 | Hakala et al. .................. 318/798 |

(Continued)

FOREIGN PATENT DOCUMENTS

| CN | 101119096 | 2/2008 |
| DE | 10249568 | 5/2004 |

(Continued)

OTHER PUBLICATIONS

PCT/EP2010/052010 International Search Report dated Jun. 28, 2010 (2 pages).

*Primary Examiner* — Paul Ip
(74) *Attorney, Agent, or Firm* — Michael Best & Friedrich LLP (57) ABSTRACT

The invention relates to an electronically commutated electric motor. The electric motor comprises a stator, and a rotor, in particular a permanent-magnetic rotor. The electric motor further comprises a control unit connected to the stator. The control unit is designed to actuate the stator such that the stator can generate a magnetic rotating field for rotationally moving the rotor. According to the invention, the control unit of the electric motor is provided with a power output stage having semiconductor switches. Subject to the low-resistance, or short-circuited, semiconductor switch of the power output stage, in particular as a result of defect, the control unit is designed to actuate the stator for generating the rotating field such that during a complete rotor revolution, the rotor can provide a mechanical output, or in the operational mode, a braking torque of the electric motor caused by the defect is reduced, or completely neutralized, by the low-resistance, or short-circuited, semiconductor switch.

15 Claims, 4 Drawing Sheets

(56) References Cited

U.S. PATENT DOCUMENTS

| | | | |
|---|---|---|---|
| 6,683,435 B1* | 1/2004 | Liang et al. | 318/727 |
| 7,109,742 B2* | 9/2006 | de Larminat et al. | 324/107 |
| 7,312,595 B2* | 12/2007 | Kamio et al. | 318/701 |
| 7,372,227 B2* | 5/2008 | Rainer et al. | 318/375 |
| 7,430,132 B2* | 9/2008 | Morishita | 363/55 |
| 8,023,234 B2* | 9/2011 | Andersen | 361/42 |
| 8,045,301 B2 | 10/2011 | Shiba et al. | |
| 8,112,194 B2* | 2/2012 | Buur et al. | 701/31.8 |
| 2002/0105239 A1* | 8/2002 | Witzig | 310/68 B |
| 2004/0008002 A1* | 1/2004 | Kamio et al. | 318/701 |
| 2004/0264075 A1* | 12/2004 | Kolomeitsev | 361/23 |
| 2006/0006899 A1* | 1/2006 | de Larminat et al. | 324/772 |
| 2006/0049794 A1* | 3/2006 | Mayhew | 318/805 |
| 2006/0103417 A1* | 5/2006 | Larminat et al. | 324/770 |
| 2006/0245222 A1* | 11/2006 | Nojima | 363/132 |
| 2007/0090783 A1* | 4/2007 | Rainer et al. | 318/703 |
| 2007/0195567 A1* | 8/2007 | Morishita | 363/55 |
| 2008/0129238 A1* | 6/2008 | Andersen | 318/565 |
| 2009/0021207 A1 | 1/2009 | Kezobo et al. | |
| 2009/0111640 A1* | 4/2009 | Buur et al. | 477/3 |
| 2010/0315025 A1* | 12/2010 | Yundt et al. | 318/375 |
| 2011/0058288 A1* | 3/2011 | Vanko et al. | 361/33 |

FOREIGN PATENT DOCUMENTS

| | | |
|---|---|---|
| DE | 102008034326 | 2/2009 |
| EP | 2009782 | 12/2008 |
| JP | 2005051901 | 2/2005 |
| JP | 2007060866 | 3/2007 |
| JP | 2007330099 | 12/2007 |
| JP | 2008049779 | 3/2008 |

\* cited by examiner

ELECTRONICALLY COMMUTATED ELECTRIC MOTOR HAVING EMERGENCY RUNNING PROPERTIES

BACKGROUND OF THE INVENTION

The invention relates to an electronically commutated electric motor. The electric motor has a stator and a rotor, which in particular has permanent magnets. The electric motor also has a control unit which is connected to the stator. The control unit is designed to control the stator such that the stator can produce a magnetic rotating field in order to rotate the rotor.

SUMMARY OF THE INVENTION

According to the invention, the control unit for the electric motor of the type mentioned initially has a power output stage with semiconductor switches. The control unit is designed to control the stator to produce the rotating field as a function of the semiconductor switch, which is shorted or connected with a low impedance in particular as a result of a defect, in the power output stage, such that the rotor can emit mechanical power over a complete rotor revolution, or a braking torque, caused by the defect, on the electric motor in the operating state is reduced or compensated for completely by the semiconductor switch which is shorted or connected with a low impedance.

The electric motor is advantageously provided with an emergency running characteristic, such that, in the event of a defective semiconductor switch in the power output stage, the electric motor can still continue to emit torque, and thus mechanical power, or produces at least a small or even no braking torque, such that, in the case of interaction with servo steering in a motor vehicle, the defect at least does not result in steering requiring any more steering force than without servo steering.

By way of example, the electric motor can emit the torque in mutually opposite operating directions. By way of example, one operating direction may be directed in the revolution direction—that is to say the positive torque direction—and an operating direction opposite this can be directed in the opposite direction to the revolution direction—as the negative torque direction.

By way of example, the semiconductor switch may be a field-effect transistor, in particular an MOS field-effect transistor or an insulated-gate bipolar transistor (IGBT). In another embodiment, the semiconductor switch may also be formed by a thyristor or a triac.

The electric motor described above can thus advantageously compensate for a defective switching path in the semiconductor switch by means of appropriate, preferably corrective, control of the power output stage and therefore also of the stator.

In one preferred embodiment of the electric motor, the control unit is designed to control the stator such that the rotor can use stored rotation energy to overcome the defect angle range of the rotor revolution which corresponds to the defective semiconductor switch. This type of control in the event of the defective semiconductor switch allows the rotor to be moved over the defect angle range by means of the previously stored rotation energy. By way of example, the defect angle range is characterized in that—because of the shorted semiconductor switch—the stator coil associated with the defective semiconductor switch permanently produces a magnetic field which corresponds to the current-flow direction through the stator coil. Because of this influence, the stator can no longer be sufficiently influenced by the stator coils in the defect angle range.

In particular and preferably, the control unit can build up sufficient rotational energy in the rotor before a magnet pole of the rotor enters the defect angle range. The rotor can therefore advantageously be used as an energy store, to overcome the defect angle range.

The control unit of the electric motor is preferably connected to, or has, a memory for mutually different control patterns and is designed to select a control pattern and to control the stator using the selected control pattern as a function of the low-impedance connection or the short.

By way of example, a control pattern for operation with functional semiconductor switches can be kept available by means of the memory and by keeping mutually different control patterns available, and can be used to control the stator during an operation with functioning semiconductor switches.

Preferably, the control patterns are each formed by a time sequence of switching patterns, wherein the switching patterns each represent a voltage state and/or current-flow state of the stator coils of the stator. Also preferably, each switching pattern is formed by a code word, and the code word has one bit for each stator coil, which bit represents a connection state of the stator coil, and thereby the voltage applied to the stator coil. The code words, and/or the connection states or the control patterns, can each be represented by one data record. In another embodiment, a control pattern has at least one or only one switching pattern, with each switching pattern being associated with a predetermined rotor angle in a rotor revolution. For this purpose, each code word may have at least two, three or a plurality of additional rotor position bits, which together code a rotor position of the rotor at which the voltages which correspond to the switching pattern can be applied to the stator coils.

If the control unit detects a defect in the semiconductor switch, for example an MOS field-effect transistor, then the control unit can read a control pattern which corresponds to that defect from the memory, and can control the stator using the previously assigned control pattern. It is advantageously still possible to operate the electric motor. During operation with the control pattern while the semiconductor switch is defective, a torque, which in particular is at least small, can at least still be emitted while, in contrast, in the case of electric motors in which the stator is disconnected from the power output stage by means of a relay, torque can no longer be emitted. For example, during an emergency running characteristic which is produced by means of the control unit, it is thus possible to accept the rotor not running at a constant speed or not emitting a constant torque throughout the rotor revolution.

By way of example and advantageously, the electric motor may be an electric motor for servo steering in a motor vehicle. In the event of a defective semiconductor switch in the power output stage, the electric motor can thus advantageously still be used to assist steering of the motor vehicle by means of the emergency running characteristic, or at least to reduce a braking torque—caused in particular by the defective semiconductor switch—to a motor shaft such that the vehicle can still be steered.

When assisting steering, the electric motor can be controlled, for example, to produce a torque acting in the revolution direction—for example with a positive torque.

By way of example, the electric motor can be controlled to produce a braking torque, which acts on the servo steering, in an opposite revolution direction—opposite the revolution direction which makes steering easier—thus producing a negative torque acting in the opposite direction to the revolution direction. Steering of the vehicle can then become more difficult, in particular in the case of correspondingly designed servo steering, with the torque acting in the negative direction. Making steering more difficult may, for example, be used for braking of the assistance effect or as a function of a steering situation which requires this to be more difficult.

The control unit is preferably designed to detect a defect, in particular a shorting of the semiconductor switch, as a function of a voltage which is dropped across at least one stator coil of the stator.

In another embodiment, the control unit is designed to detect the defect in the semiconductor switch as a function of a star-point voltage or a phase voltage of a stator which is connected in star or delta. Furthermore, the control unit is preferably designed to keep a defect control pattern, corresponding to the semiconductor switch, available for each semiconductor switch, corresponding to the defective semiconductor switch. This allows the control unit to quickly produce control signals corresponding to the control pattern, by means of which the power output stage can be controlled.

In one preferred embodiment, the control unit is designed to control the stator by means of the semiconductor switches which are not connected with a low impedance or shortened, in an angle range which follows the defect angle range in the rotor revolution direction, such that the rotor can be moved away from the defect angle range. Locking of the electric motor can thereby advantageously be avoided. If the electric motor locks up, the rotor can, for example, be held fixed in the defect angle range by the magnetic field which is produced continuously in the defect angle range, such that it no longer continues to rotate in the revolution direction. The semiconductor switches which have not been connected with a low impedance are in this case those semiconductor switches which are not defective, that is to say which are still intact.

The control unit is preferably designed to use the stator coils to produce the next-possible voltage vector following the defect angle range and to use the next-possible voltage vector to move the rotor out of the defect angle range—in particular in the revolution direction. By way of example, the next-possible voltage vector may be further away from the defect angle range in the rotor revolution direction during normal operation of the electric motor—which is produced, for example, by a control pattern corresponding to normal operation—and may therefore not represent the next-possible voltage vector in the case of a defective semiconductor switch. In the case of a control pattern intended for normal operation, for example, a voltage vector which is intended to be the next for movement of the rotor may, for example, no longer be sufficient to produce a torque in an angle range following the defect angle range in order to move the rotor reliably away from the defect angle range.

By way of example, the stator of the electric motor has at least three, or three and only three stator coils. It is also feasible for a stator to have any desired number of stator coils.

The electric motor preferably has an intermediate-circuit capacitor which is at least indirectly connected to the power output stage, in particular to the semiconductor switches in the power output stage, wherein the electric motor has an isolating switch, in particular a relay or a semiconductor switch, which is designed to be controllable and whose switching path connects the intermediate-circuit capacitor to the power output stage, wherein a control connection of the isolating switch is connected to the control unit, which is designed to produce a control signal for disconnection of the switching path of the isolating switch as a function of a defect of the intermediate-circuit capacitor, in particular through the defect of electrodes of the intermediate-circuit capacitor being connected to one another with a low impedance or being shorted, and to send this control signal to the isolating switch.

The invention also relates to a method for production of a rotary movement by means of an electronically commutated electric motor, wherein the electric motor has a stator and a rotor. In the method, a magnetic rotating field for rotating the rotor is produced by controlling a plurality of semiconductor switches which are connected to the stator. Furthermore, in the method, the rotating field is produced as a function of a semiconductor switch which, in particular, is shorted or connected with a low impedance because of a defect, in that the rotor can emit mechanical power over a complete rotor revolution, or a braking torque, caused by the defect, of the electric motor (1, 160) in the operating state is reduced or completely compensated for by the semiconductor switch which is shorted or connected with a low impedance.

In one preferred embodiment of the method, the stator is controlled such that the rotor can use stored rotation energy to overcome a defect angle range of the rotor revolution which corresponds to the defective semiconductor switch.

Preferably, in the method described above, a control pattern for operation with intact semiconductor switches, and at least one control pattern for at least one defective semiconductor switch, are kept available. Furthermore, a control pattern which corresponds to the defective semiconductor switch is selected as a function of the low-impedance connection or the short, and the stator is controlled using the selected control pattern.

The control pattern can advantageously represent a transfer function. By way of example, a transfer function may represent a torque—over the rotor revolution—as an input parameter, and a control voltage for each stator coil as an output parameter. By way of example, the transfer function can be kept available for every possible defective semiconductor switch, in particular MOSFET. By way of example, the transfer function may be kept available for a stator coordinate system, in particular a u-v-w coordinate system, or a rotor coordinate system, in particular a d-q coordinate system.

One control pattern for the defective semiconductor switch is preferably kept available for each semiconductor switch.

In one preferred embodiment of the method, a control pattern which corresponds to the defective semiconductor switch is produced as a function of the low-impedance connection or the short, and the stator is controlled using the control pattern produced for the defective semiconductor switch.

The production, in particular in-vivo production, of the control pattern—in particular as a function of the nature of the defect—advantageously makes it possible to keep a small number of defect control patterns available. For example, a phase shift which corresponds to the defective semiconductor switch in the control pattern that is produced can be taken into account when producing the defect control pattern. In this way, it is then advantageously possible, for example, to keep the same control pattern available for each of a plurality of semiconductor switches—which may possibly become defective at a later time—as a starting point for production of the respectively appropriate control pattern for the defective semiconductor switch.

BRIEF DESCRIPTION OF DRAWINGS

The invention will now be described in the following text with reference to figures and further exemplary embodiments.

DETAILED DESCRIPTION

Figure 1:
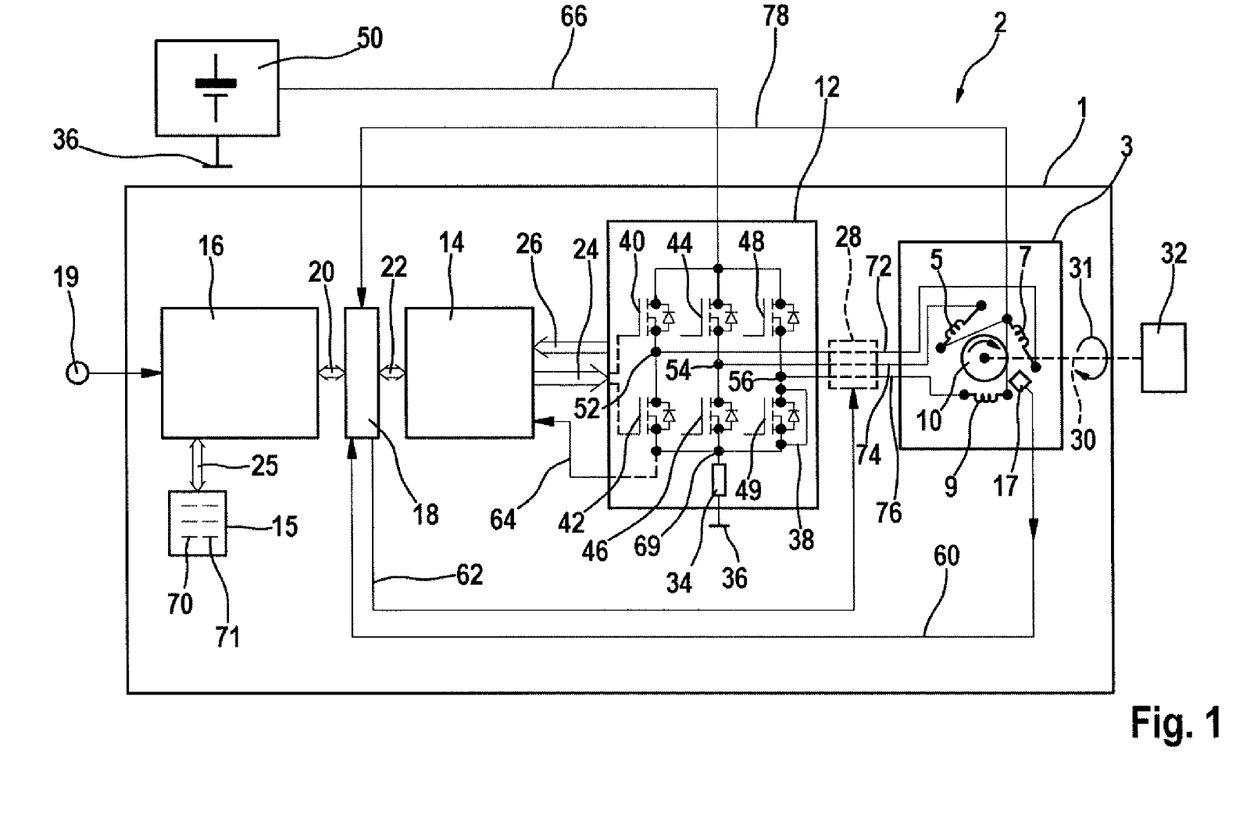
FIG. 1 shows—schematically—one exemplary embodiment of an electronically commutated electric motor, and a method for operation of the electric motor. The electric motor has a power output stage and a control unit, which is designed to control the power output stage by means of a control pattern, which is designed for a faulty output stage, such that a stator, which is connected to the output side of the power output stage, of the electric motor can produce a rotating field in order to rotate a rotor of the electric motor.

FIG. 1 shows—schematically—an arrangement 2 having an electronically commutated electric motor 1. The electronically commutated electric motor 1 has a stator 3. The stator 3 has a stator coil 5, a stator coil 7 and a stator coil 9. The electric motor 1 also has a rotor 10 as well as a Hall sensor 17. The Hall sensor 17 is arranged such that a rotor rotation speed and/or a rotor position of the rotor 10 can be detected by means of the Hall sensor 17. The Hall sensor 17 is designed to produce an appropriate Hall voltage as a function of a magnetic field produced by the rotor 10, and to emit this Hall voltage on the output side.

The electric motor 1 also has a power output stage 12, whose output side is connected to the stator, and to the stator coils 5, 7 and 9 there, and whose input side is connected to a gate driver 14 by means of a connection 24. The gate driver 14 is connected to an interface 18 via a bidirectional connection 22. The interface 18 is connected via a bidirectional connection 20 to a processing unit 16 which, for example, is in the form of a microcontroller or microprocessor.

The processing unit 16, or additionally the gate driver 14, can form the control unit mentioned above.

The processing unit 16 is connected to a memory 15 via a bidirectional connection 25. The memory 15 is designed to keep a plurality of data records available, which each represent one control pattern. By way of example, the control patterns are annotated 70 and 71. The bidirectional connections 20, 22 and 25 and the connection 24 may each be formed, for example, by a data bus in particular a fieldbus, or may be a component of a data bus. The power output stage 12 has a plurality of semiconductor switches, in this exemplary embodiment six MOS field-effect transistors, specifically a transistor 40, a transistor 44, a transistor 48, a transistor 42, a transistor 46 and a transistor 49. The transistors mentioned above are connected together in a B6 circuit. The gate connections of the abovementioned transistors are each connected to the gate driver 14 via the connection 24. The gate driver 14 is designed to control the gate connections of the transistors 40, 42, 44, 46, 48 and 49 via the connection 24. A freewheeling diode for protection of the transistor against overvoltage is connected in parallel with the switching paths of each of the transistors, with the switching path connecting a source connection of the transistor to a sink connection of the transistor.

The transistor 40 has a source connection which is connected to a sink connection of the transistor 42 via a connecting node 52. A source connection of the transistor 44 is connected to a sink connection of the transistor 46 via a connecting node 54. A source connection of the transistor 48 is connected to a sink connection of the transistor 49 via a connecting node 56. The source connections of the transistors 42, 46 and 49 are each connected to a connecting node 69. The connecting node 69 is connected to a ground connection 36 via a resistor 34. The resistor 34, in particular a shunt resistor, has a low impedance and is designed for current detection.

The connecting node 52 is connected to a first connection of the stator coil 7 via a connecting line 72. The connecting node 54 is connected to a first connection of the stator coil 5 via a connecting line 74. The connecting node 56 is connected to a first connection of the stator coil 9 via a connecting line 76. The second connections of the stator coils 5, 7 and 9 are each connected to one another via a common star point. The star point is connected to the interface 18 via a connecting line 78. The output side of the power output stage 12 is connected to the gate driver 14 via, in particular, a multichannel connection 26. The multichannel connection 26 connects the connecting nodes 52, 54 and 56 to the power output stage 14. The power output stage 14 can therefore receive the potentials of the connecting nodes 52, 54 and 56, and therefore of the corresponding stator coils, via the connection 26.

The sink connections of the transistors 40, 44 and 48 are each connected to a connecting node 68. The connecting node 68 is connected to an on-board power supply system 50 in a motor vehicle via a connecting line 66. The on-board power supply system 50 is connected to the ground connection 36 and is designed to supply electrical power to the power output stage 12 via the connecting line 66. The figure also shows a relay 28—illustrated by dashed lines—which is designed to galvanically isolate the connecting nodes 52, 54 and 56 from the stator 3, in particular as a function of a disconnection signal which is received via the connecting line 62. As indicated by dashed lines, the relay 28 may be omitted. The input side of the relay 28 is connected via the connecting line 62 to the interface 18, and can receive the disconnection signal from it.

In FIG. 1, the electric motor 1 is a component of an arrangement 2. The arrangement 2 comprises the electric motor 1, the on-board power supply system 50 and servo steering 32. The servo steering 32 is rotationally connected to the rotor 10 by means of a motor shaft 30. The rotor 10 can thus emit a torque 31 to the servo steering 32 via the motor shaft 30.

The method of operation of the arrangement 2 will now be described in the following text:

The processing unit 16 can read the control pattern 70 from the memory 15 via the connection 25. By way of example, the control pattern 70 represents a control pattern for normal operation of the electric motor 1. By way of example, none of the transistors in the power output stage 12 is defective during normal operation of the electric motor 1. The processing unit 16 can control the gate driver 14 via the connection 20 and the interface 18, and then via the connection 22, such that the gate driver 14 produces control signals in order to control the transistors in the power output stage 12 such that the power output stage 12 drives the stator 3, and the stator coils 5, 7 and 9 there, in order to produce a rotating field. The rotor 10 can be made to rotate along the rotor revolution by means of the rotating field. The gate driver 14 can send the control signals for controlling the transistors in the power output stage 12 via the connection 24 to the power output stage 12, and to the gate connections of the transistors there.

The rotation speed of the rotor 10 can be detected by means of the Hall sensor 17, which can produce a corresponding Hall signal and can send this via the connecting line 60 to the interface 18. The interface 18 can send the Hall signal to the processing unit 16 via the connection 20. The processing unit 16 can receive the Hall signal and can produce or change control signals—which together represent the control pattern—such that the torque of the rotor 10, which can be emitted to the servo steering 32 via the motor shaft 30, corresponds to a required torque. For this purpose, the processing unit can receive a control signal, which represents the required torque, via a control input 19.

For example, if the transistor 49 is defective, then the source connection of the transistor 49 can be connected with a low impedance to the sink connection of the transistor 49. The figure also shows a connection 38, which represents the low-impedance connection or the short. The low-impedance connection 38 thus bridges the switching path of the transistor 49, and represents the defective transistor 49.

The processing unit 16 can detect the low-impedance connection 38 via the resistor 34, and in particular a voltage which is dropped across the resistor 34, and the processing unit 16 can receive this voltage via the connecting node 69 and then—indicated partially by dashed lines—via the connecting line 64, the power output stage 14, the connection 22, the interface 18, and the connection 20.

The processing unit 16 can detect the low-impedance connection 38 for example—in addition to or independently of the resistor 34—via the star-point potential of the stator 3, via the connecting line 78, the interface 18 and the connection 20.

The processing unit can detect—in addition to or independently of the resistor 34 or the star-point potential—the low-impedance connection 38 via the potentials at the connecting nodes 52, 54 or 56, or at all the connecting nodes. In this case, the potentials at each of the connecting nodes correspond to a potential of a stator coil.

Furthermore, the processing unit 16 can detect the defect in the transistor 49 as a function of the low-impedance connection 38 and, furthermore, can read an appropriate control pattern 71 from the memory 15 as a function of the defect, and can produce appropriate control signals for operating the gate driver 14 and the power output stage 12. The rotating field produced in this way makes it possible to compensate at least partially for the defect in the transistor 49, and thus at least partially to heal it. In this case, the rotating field is represented by the control pattern 71 which corresponds to the defective transistor 49.

By way of example when a plurality of transistors are defective—if it is no longer possible to produce a rotating field for production of a positive torque 31 by means of a corresponding control pattern which at least partially compensates for the defect—the processing unit 16 can disconnect the stator 3 from the power output stage 12 by means of the relay 28. For this purpose, the processing unit 16 can produce a corresponding disconnection signal, and can send this via the connection 20, the interface 18 and the connecting line 62 to the relay 28.

Figure 2:
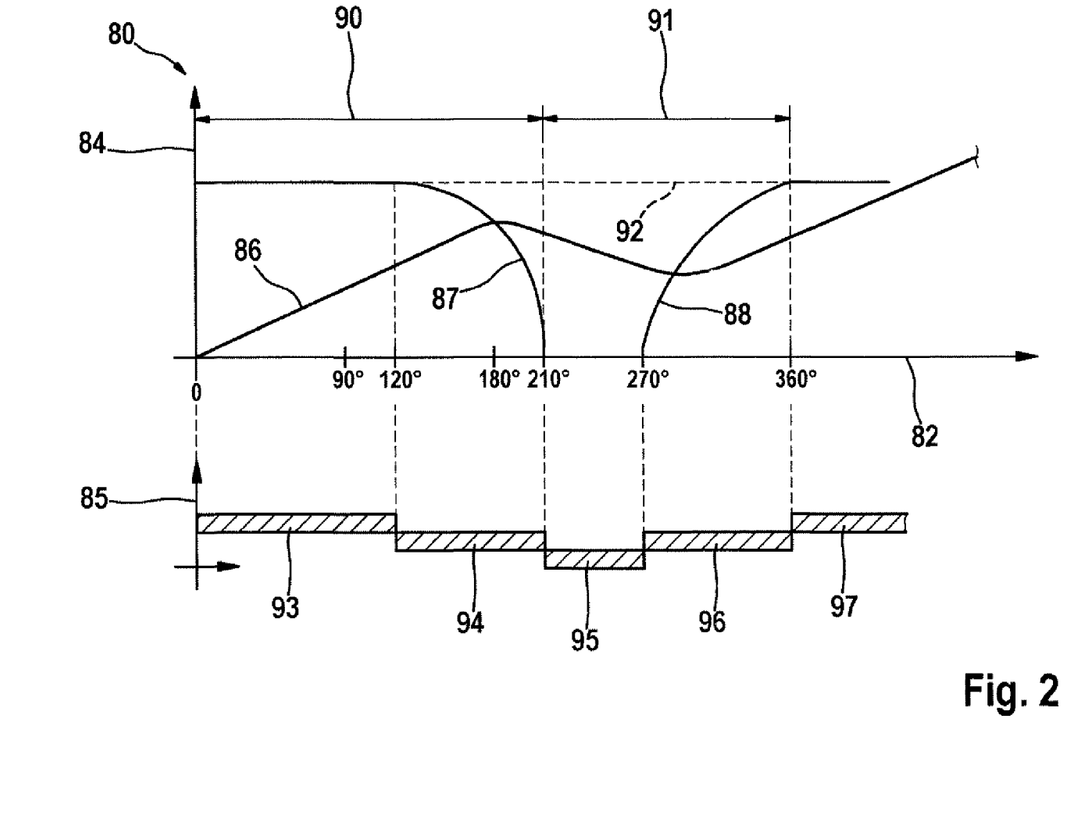
FIG. 2 shows—schematically—one exemplary embodiment of a torque profile for the electric motor illustrated in FIG. 1, with a power output stage in which a transistor in the power output stage has been shorted or connected with a low impedance, in particular because of a defect.

FIG. 2 shows one exemplary embodiment for a diagram 80. The diagram 80 has an abscissa 82 and an ordinate 84.

The abscissa 82 represents an angle of the rotor revolution of the rotor 10 illustrated in FIG. 1.

The diagram 80 shows a rotation speed curve 86, which represents a rotation speed of the rotor 10 illustrated in FIG. 1, in particular as a function of the rotor revolution angle, and this is plotted on the abscissa 82.

The diagram 80 also shows a curve 87 and a curve 88. The curve 87 represents a relative torque, which can be emitted from the rotor 10 in FIG. 1. The relative torque describes the torque of the rotor with respect to a maximum torque to be emitted by the rotor 10. The maximum relative torque therefore assumes the nondimensional value=1.

The diagram 80 also shows a section 93, a section 94, a section 95, a section 96 and a section 97. The section 93 corresponds to an area of the rotor revolution between 0 and 120°, the section 94 corresponds to an area of the rotor revolution between 120 and 210°, the area 95 corresponds to an area of the rotor revolution between 210 and 270°, the area 96 corresponds to an area of the rotary revolution between 270 and 360°, and the area 97 corresponds to a further rotor revolution beyond 0°.

A section 93 of the curve 87 represents a maximum torque of the rotor 10, in which case the torque of the rotor 10 can be seen to decrease in the area 94.

The rotor 10 cannot emit any torque in the area 95 which corresponds to the defect angle range. The defect angle range, represented by the area 95, is followed by the area 96 in which a torque can once again be emitted—described by the curve 88. The torque which can possibly be emitted in this case increases as the rotor revolution angle increases.

The diagram 80 also shows a section 90 which denotes the rotor revolution angle between 0° and 210°. The torque 31 emitted by the rotor 10 can still be controlled in the section 90.

In the area 91, which extends between the rotor revolution angles 210° and 360°, the rotor is influenced by a magnetic field produced by the stator coil through which current flows permanently because of the defective transistor. In the area 91, the rotor can continue to move in the revolution direction, or in the opposite direction to the revolution direction, virtually or completely without any power. In the area 96 from the rotor revolution angle 270° to a greater rotor revolution angle, the rotor can be moved out of the area 95 by means of a voltage vector which is the next that can possibly be produced. In the area 93 and/or 94, the rotor 10 can be supplied with rotational energy by means of the control pattern produced for the situation in which the transistor is defective, and which is adequate to move the rotor beyond the area 95, specifically the defect angle range. The figure also shows an ordinate 85, which represents a torque which can be emitted.

Figure 3:
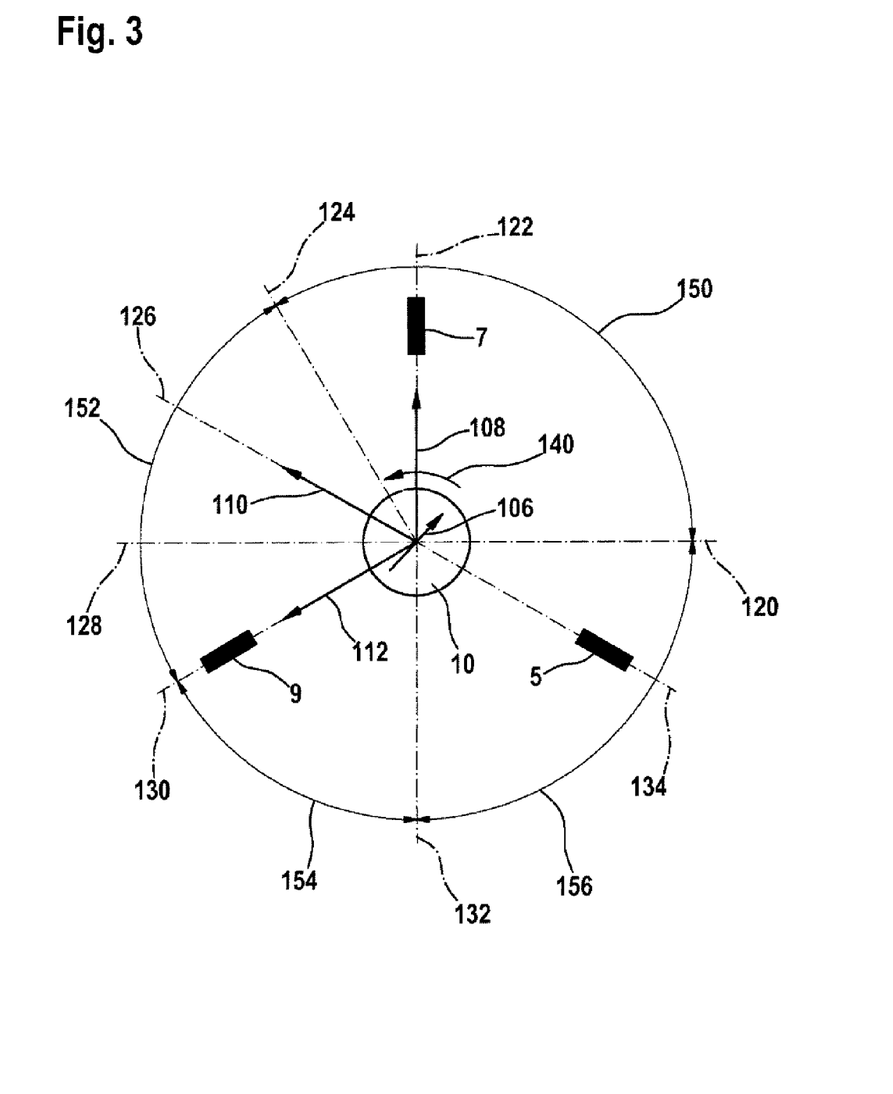
FIG. 3 shows—schematically—a diagram illustrating one rotor revolution of an electronically commutated electric motor with three stator coils.

FIG. 3 shows a diagram in which the rotor revolution angle of the rotor 10, as already illustrated in FIG. 1, is illustrated with respect to the stator coils 5, 7 and 9. The diagram shows a magnet vector 106, which represents an alignment of the magnetic field produced by the rotor 10, which has permanent magnets. The diagram also shows an axis 120, which represents a 0° position of the rotor revolution, an axis 122 which runs at right angles to the axis 120 and represents a 90° position of the rotor revolution, furthermore an axis 128 which runs coaxially with respect to the axis 120, and represents a 180° position of the rotor revolution, as well as an axis 132 which represents a 270° position of the rotor revolution.

Furthermore, FIG. 3 shows the stator coils 5, 7 and 9, which have already been illustrated in FIG. 1. The stator coil 5 is located on an axis 134 which represents a 330° position of the rotor revolution. The stator coil 7 is located on an axis 122 which represents the 90° position of the rotor revolution. The stator coils 9 are located on an axis 130 which represents a 210° position of the rotor revolution. The figure also shows an axis 124, and an axis 126, wherein the axis 124 represents a 120° position, and the axis 126 represents a 150° position, of the rotor revolution.

The illustration also shows an angle range 150 which extends between the axes 120 and 124. The angle range 150 corresponds to the area 93 illustrated in FIG. 2. An angle range 152 extends between the axis 124 and the axis 130, and corresponds to the area 94 illustrated in FIG. 2. The rotor 10 can still emit a torque in the angle range 152, decreasing along the rotor revolution towards the axis 130. The rotor revolution is denoted by a rotation arrow 140. The angle range 154 extends between the axes 130 and 132 and corresponds to the defect angle range 95 in FIG. 2. The rotor 10 cannot emit any torque, or only a small amount of torque, in the area of the angle range 154. The area 156 in which the rotor 10 can still increasingly emit a torque—as the revolution angle increases—extends between the axis 132 and the axis 120. The figure also shows voltage vectors 108, 110 and 112.

The axes 120, 122, 124, 146, 128, 130, 132 and 134 relate to the revolution of the rotor field. The voltage vector 108 corresponds to a phase voltage of the stator coil 7, the voltage vector 110 corresponds to a phase voltage of the stator coil 5, and the voltage vector 112 corresponds to a phase voltage of the stator coil 9. The rotor movement of the rotor 10 can be controlled by means of the voltage vectors 108, 110 and 112, for example by means of the processing unit 16 illustrated in FIG. 1.

Figure 4:
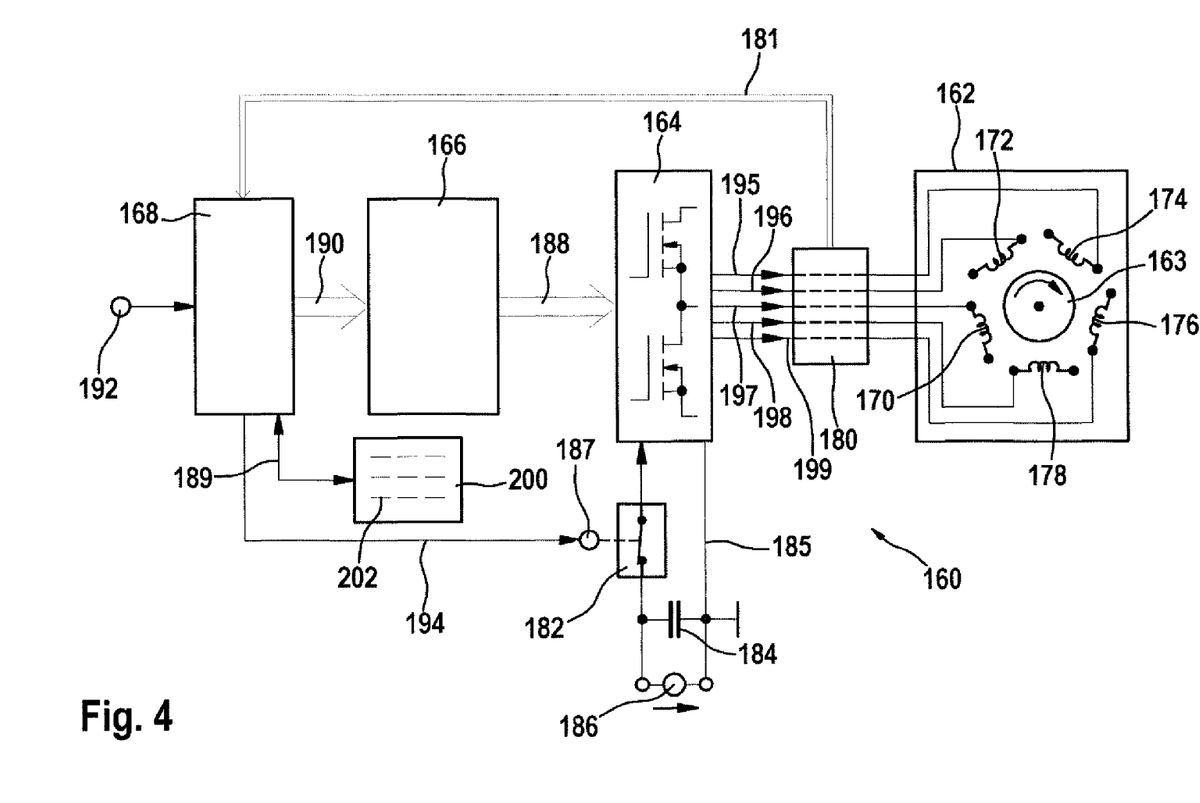
FIG. 4 shows a circuit arrangement for an electronically commutated electric motor with an intermediate-circuit capacitor and with an isolating switch, which is designed to be controllable and, in the event of a defect of the intermediate-circuit capacitor, can isolate a power output stage of the electric motor from the intermediate-circuit capacitor.

FIG. 4 shows an exemplary embodiment of an electronically commutated electric motor 160. The electric motor 160 has a stator 162. The stator 162 has five stator coils, namely a stator coil 170, a stator coil 172, a stator coil 174, a stator coil 176 and a stator coil 178. The stator 162 is designed to produce a magnetic rotating field when current is passed through it, in order to rotate a rotor 163 of the electric motor 160. By way of example, the rotor 163 has permanent magnets.

The electric motor 160 also has a power output stage 164. The power output stage 164 is connected on the output side via a current sensor 180 to the stator 162. By way of example, the power output stage 164 has five transistor half-bridges, with the output side of each half-bridge being connected via the current sensor 180 to the stator coil of the stator 162. The output side of the power output stage 164 is connected via a connecting line 195 to the stator coil 174. A connecting line 196 connects the power output stage 164 to the stator coil 172, a connecting line 197 connects the output side of the power output stage 164 to the stator coil 170, a connecting line 198 connects the power output stage 164 to the stator coil 178, and a connecting line 199 connects the power output stage 164 to the stator coil 176. The power output stage 164 is designed to pass current through the stator 162, in particular through the stator coils of the stator 162, in order to produce a magnetic rotating field, in order to rotate the rotor 163. To this end, the input side of the power output stage 164 is connected to an intermediate circuit, comprising a voltage source 186, in particular a DC voltage source, and an intermediate-circuit capacitor 184, which is connected in parallel with the voltage source 186.

One connection of the voltage source 186 is connected to the power output stage 164 via a connecting line 185. The connecting line 185 is a ground line in this exemplary embodiment. The power output stage 164 is connected via an isolating switch 182 to another connection of the voltage source 186, and therefore also to another connection of the intermediate-circuit capacitor 184. By way of example, the isolating switch 182 is a relay or a semiconductor switch. By way of example, the semiconductor switch is a switching transistor, in particular a field-effect transistor or a thyristor. The isolating switch 182 has a control input 187, which is connected to a control unit 168 via a connecting line 194.

The control unit 168 is connected to one input 192 of the electric motor 160 and is designed to control the power output stage 164 via a gate driver 166 as a function of a control signal, which, for example, represents a current nominal value of a stator coil current of the stator 162, such that the stator 162 can produce a magnetic rotating field in order to rotate the rotor 163.

The output side of the control unit 168 is connected via a connection 190 to the gate driver 166. The output side of the gate driver 166 is connected via a connection 188 to the power output stage 164. The input side of the control unit 168 is also connected via a connection 181 to the current sensor 180 and can receive current signals, which each represent a stator coil current in one of the stator coils of the rotor 162, via the connection 181 from the current sensor 180. For this purpose, for example, the current sensor 180 may have a shunt resistor for each stator coil of the stator 162. The method of operation of the electric motor 160 will now be described in the following text:

The control unit 168 is designed to produce control signals in order to rotate the rotor 163, as a function of a control signal which is received at the input 192, and to send these control signals via the connection 190 to the gate driver 166. By way of example, the control signals may each be coded in accordance with a binary coding, in which case the binary coding has one bit for each stator coil. The control signals produced by the control unit 168 for rotating the rotor 163 may, for example, have a time sequence of code words which each have one bit for each stator coil: in this exemplary embodiment, the code words are five-bit words, and each have five bits. Each bit in the bit words in this case represents a connection state of the stator 162, in particular a switching state of the power output stage and therefore also a voltage state and/or a current-flow state for each stator coil in the stator 162, also referred to in the following text as a switching pattern. For this purpose, the control unit 168 is connected via a connecting line 189 to a memory 200, in which data records are stored, which represent respectively mutually different switching patterns. A time sequence of switching patterns together form one of the control patterns mentioned above.

By way of example, a bit word for a time at which the stator coil 170 is activated, but the remaining stator coils are intended to be deactivated, may have a bit with the logic value "one" for the stator coil 170, and may have a bit with the logic value "zero" for each of the remaining stator coils.

In order to pass current through the stator 162, the control unit 168 can, for example, produce a time sequence of control signals which each represent a code word, with each code word representing a switching pattern of the rotor 162.

The gate driver 166 can control the power output stage 164, in particular the gate connections of the transistor half-bridges in the power output stage 164, as a function of the control signals received on the input side via the connection 190, in this exemplary embodiment, the code word received on the input side, in order to produce the switching pattern which corresponds to the control signal, in particular to the code word.

Furthermore, the power output stage 164 can apply a voltage to the stator 162 corresponding to the switching patterns, as a function of the control signals produced by the gate driver 166, and can thus also pass current through it, corresponding to the control signals received from the gate driver 166.

If for example—in the event of a fault—one semiconductor switch in a transistor half-bridge in the power output stage 164 is defective, in particular with the switching path of the semiconductor switch being shorted or connected with a low impedance, then the corresponding stator coil of the stator 162 is continuously connected to a corresponding potential of the voltage source 186, and current correspondingly flows through it all the time. The current sensor 180 can send the current signal, which represents the defect in the transistor half-bridge, via the connection 181 to the control unit 168. The control unit 168 can detect the current signal which represents the defect, and can produce the time sequence of control signals, which each represent a switching pattern, in a corresponding manner to that already described above, in particular in FIG. 2, as a function of the current signal which represents the defect. Despite the defective transistor half-bridge, the stator 162 can thus still produce a magnetic rotating field such that a braking torque which acts on the rotor 163 is reduced in comparison to a time sequence of switching patterns which are provided for a power output stage 164 which is not defective. By way of example, the control unit 168 can produce the time sequence of control signals, which each represent a switching pattern, such that the braking torque is reduced or disappears, or, as already described with reference to the electric motor in FIG. 1, a positive drive torque can be produced by the electric motor 160.

A different fault situation may occur, for example, as a result of a defective intermediate-circuit capacitor. Specifically, if the intermediate-circuit capacitor 184 is defective during operation of the electric motor 160, in particular with electrodes of the intermediate-circuit capacitor 184 being connected to one another with a low impedance or being shorted to one another, current still flows from the power output stage 164 through the stator 162, in particular a lesser current than if the intermediate-circuit capacitor 184 were intact. A current change in at least one stator coil current can be detected by the current sensor 180, and a corresponding current signal can be sent from the current sensor 180 via the connection 181 to the control unit 168. By way of example, the current signal is a voltage dropped across a shunt resistor which forms the current sensor. The control unit 168 is designed to produce a control signal for disconnection of the switch 182 as a function of the current signal which represents the current drop, and to send this via the connecting line 194 to the control connection 187 of the switch 182. The isolating switch 182 can disconnect the power output stage 164 from the voltage source 186, and from the defective intermediate-circuit capacitor 184 as well, as a function of the control signal received at the input 187. If current can then no longer be passed through the stator 162 of the electric motor 160, because the power output stage 164 has been disconnected from a supply voltage, in this exemplary embodiment the voltage source 168, the stator 162 can also no longer produce any braking torque by means of the rotor 163.

Servo steering, connected to the electric motor 160, in a motor vehicle can then also not experience an additional braking torque as a result of the defective switching transistor in the electric motor 160. A vehicle with servo steering can then be steered with a steering force which corresponds to the vehicle being steered without servo steering.

The invention claimed is:

1. An electronically commutated electric motor (1, 160), comprising:
    a stator (3, 162);
    a rotor (10, 163);
    a control unit (14, 16, 168) connected to the stator (3, 162) and configured to control the stator (3, 162) such that the stator (3, 162) can produce a magnetic rotating field in order to rotate the rotor (10, 163); and
    a power output stage (12, 164) with semiconductor switches (40, 42, 44, 46, 48, 49), the power output stage (12, 164) configured to control the stator (3);
    wherein when one of the semiconductor switches (40, 42, 44, 46, 48, 49) is shorted or connected with a low impedance as a result of a defect, the power output stage (12, 164) produces a rotating field such that the rotor produces mechanical power (31) over a complete rotor revolution (150, 152, 154, 156), or a braking torque, caused by the defect, is reduced or compensated for completely.

2. The electronically commutated electric motor (1) as claimed in claim 1, wherein the control unit (16, 14, 168) is configured to control the stator (3) such that the rotor (10) can use rotation energy to overcome the defect angle range (95, 154) of the rotor revolution which corresponds to the defective semiconductor switch (49).

3. The electronically commutated electric motor (1) as claimed in claim 1, wherein the control unit (14, 16, 168) is connected to a memory for mutually different control patterns and is configured to select a control pattern and to control the stator using the selected control pattern as a function of the low-impedance connection or the short.

4. The electronically commutated electric motor (1, 160) as claimed in claim 3, wherein the control patterns are each formed by a time sequence of switching patterns (202), wherein the switching patterns (202) each represent a voltage state and current-flow state of the stator coils (170, 172, 174, 176, 178) of the stator (162), and wherein each switching pattern (202) is formed by a code word, and the code word has one bit for each stator coil (170, 172, 174, 176, 178), which bit represents the voltage state and current-flow state of the stator coil.

5. The electronically commutated electric motor (1, 160) as claimed in claim 3, wherein the control patterns are each formed by a time sequence of switching patterns (202), wherein the switching patterns (202) each represent a voltage state of the stator coils (170, 172, 174, 176, 178) of the stator (162), and wherein each switching pattern (202) is formed by a code word, and the code word has one bit for each stator coil (170, 172, 174, 176, 178), which bit represents the voltage state of the stator coil.

6. The electronically commutated electric motor (1, 160) as claimed in claim 3, wherein the control patterns are each formed by a time sequence of switching patterns (202), wherein the switching patterns (202) each represent a current-flow state of the stator coils (170, 172, 174, 176, 178) of the stator (162), and wherein each switching pattern (202) is formed by a code word, and the code word has one bit for each stator coil (170, 172, 174, 176, 178), which bit represents the current-flow state of the stator coil.

7. The electronically commutated electric motor (1) as claimed in claim 1, wherein the control unit (14, 16) is configured to control the stator (3) by the semiconductor switches (40, 42, 44, 46, 48) which are not connected with a low impedance, in an angle range (96) which follows a defect angle range (95) in the rotor revolution direction, such that the rotor (10) is moved away from the defect angle range (95).

8. The electronically commutated electric motor (160) as claimed in claim 1, wherein the electric motor has an intermediate-circuit capacitor (184), which is at least indirectly connected to the power output stage (164), wherein the electric motor (160) has an isolating switch (182) which is controllable and whose switching path connects the intermediate-circuit capacitor (184) to the power output stage (164), wherein a control connection (187) of the isolating switch (182) is connected to the control unit (168), which produces a control signal for disconnection of the switching path of the isolating switch (182) as a function of a defect of the intermediate-circuit capacitor, and sends the control signal to the isolating switch (182).

9. The electronically commutated electric motor (160) as claimed in claim 8, wherein the intermediate-circuit capacitor (184) is at least indirectly connected to the semiconductor switches in the power output stage (164).

10. The electronically commutated electric motor (160) as claimed in claim 8, wherein the defect of the intermediate-circuit capacitor (184) is a defect of electrodes of the intermediate-circuit capacitor (184) being connected to one another with a low impedance or being shorted.

11. A method for production of a rotary movement by an electronically commutated motor (1) having a stator (3) and a rotor (10), the method comprising:

produce a magnetic rotating field to rotate the rotor (10) of the electric motor (1) by controlling a plurality of semiconductor switches (40, 42, 44, 46, 48, 49) which are connected to the stator (3, 5, 7, 9);

wherein when the rotating field is produced as a function of a semiconductor switch (49) which is shorted or connected with a low impedance because of a defect, the rotor (10) produces mechanical power (31) over a complete rotor revolution, or a braking torque, caused by the defect, is reduced or completely compensated for by the semiconductor switch which is shorted or connected with a low impedance.

12. The method as claimed in claim 11, wherein the stator (3, 5, 7, 9) is controlled such that the rotor (10) can use rotation energy to overcome a defect angle range (95) of the rotor revolution which corresponds to the defective semiconductor switch (49).

13. The method as claimed in claim 12, wherein a control pattern which corresponds to the defective semiconductor switch (49) is produced as a function of the low-impedance connection (38) or the short (38), and the stator (3, 5, 7, 9) is controlled using the control pattern produced for the defective semiconductor switch (49).

14. The method as claimed in claim 11, wherein a control pattern (70) for operation with intact semiconductor switches (40, 42, 44, 46, 48), and at least one control pattern (71) for at least one defective semiconductor switch (49), are kept available, and a control pattern (71) which corresponds to the defective semiconductor switch (49) is selected as a function of the low-impedance connection (38) or the short (38), and the stator (3, 5, 7, 9) is controlled using the selected control pattern (71).

15. The method as claimed in claim 14, wherein a control pattern (71) for the defective semiconductor switch (40, 42, 44, 46, 48, 49) is kept available for each semiconductor switch (40, 42, 44, 46, 48, 49).

* * * * *